(12) United States Patent
Inukai et al.

(10) Patent No.: US 8,000,923 B2
(45) Date of Patent: Aug. 16, 2011

(54) SEMICONDUCTOR INTEGRATED CIRCUIT

(75) Inventors: Takashi Inukai, Kawasaki (JP); Yukihiro Urakawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 12/043,584

(22) Filed: Mar. 6, 2008

(65) Prior Publication Data

US 2008/0162067 A1 Jul. 3, 2008

Related U.S. Application Data

(60) Division of application No. 11/261,536, filed on Oct. 31, 2005, now Pat. No. 7,392,152, which is a continuation of application No. PCT/JP2005/016353, filed on Aug. 31, 2005.

(30) Foreign Application Priority Data

Mar. 31, 2005 (JP) ................................ 2005-101446

(51) Int. Cl.
*G01K 15/00* (2006.01)
(52) U.S. Cl. ........................................................ 702/150
(58) Field of Classification Search .................... 702/150
See application file for complete search history.

(56) References Cited

U.S. PATENT DOCUMENTS

| 5,956,289 | A | 9/1999 | Norman et al. |
| 6,002,627 | A | 12/1999 | Chevallier |
| 6,006,169 | A | 12/1999 | Sandhu et al. |
| 2003/0034851 | A1 | 2/2003 | Norman et al. |
| 2003/0158697 | A1* | 8/2003 | Gold et al. ..................... 702/132 |
| 2004/0071191 | A1 | 4/2004 | Sim et al. |

FOREIGN PATENT DOCUMENTS

| JP | 2000-55742 | 2/2000 |
| WO | WO 2005/001405 A1 | 1/2005 |

OTHER PUBLICATIONS

Michael L. Dunbar, Single Chip ASICs for Smart Sensor Signal conditioning, 1998 IEEE, p. 44-50.*
http://mw1.merriam-webster.com/dictionary/calibrate, p. 1.

* cited by examiner

*Primary Examiner* — Tung S Lau
(74) *Attorney, Agent, or Firm* — Oblon, Spivak, McClelland, Maier & Neustadt, L.L.P.

(57) ABSTRACT

A semiconductor integrated circuit according to the examples of the present invention is applied to a system using a first power source voltage and a second power source voltage independent of the first power source voltage and includes a first area to which the first power source voltage is supplied, a thermal sensor placed in the first area, and a first input path placed in the first area, for transferring trimming data that determine the control contents of the thermal sensor to the thermal sensor.

11 Claims, 13 Drawing Sheets

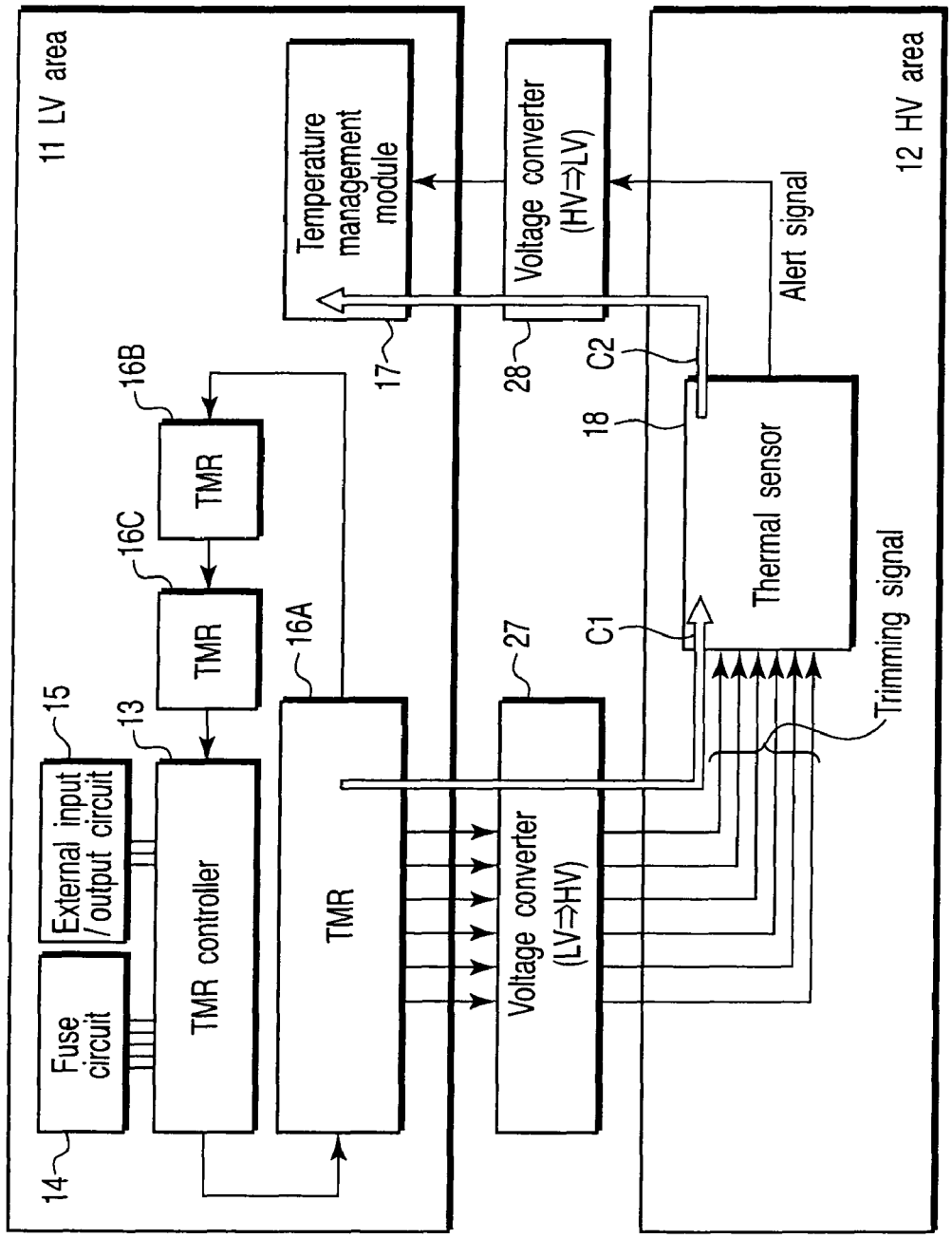
F I G. 2

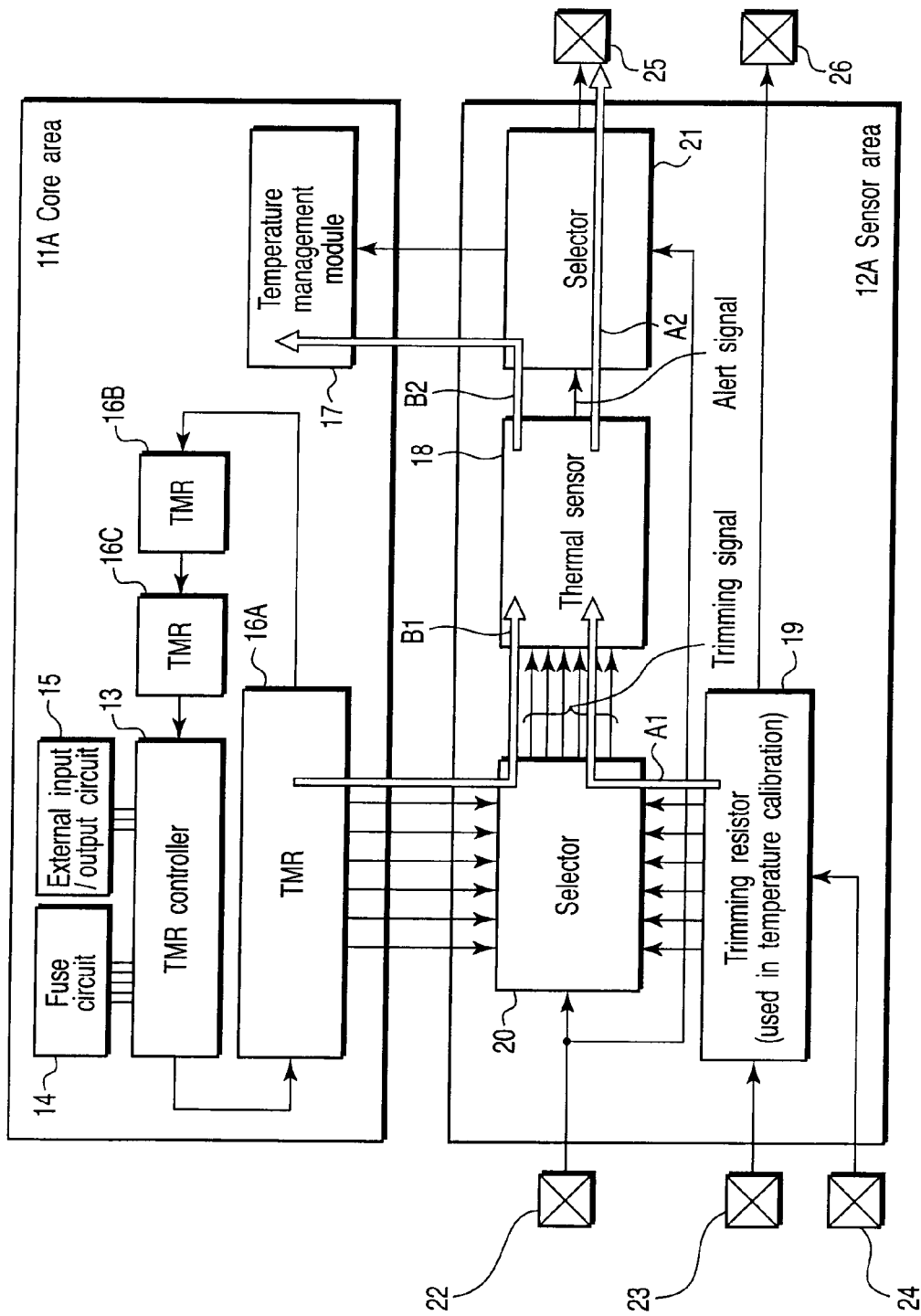
F I G. 5

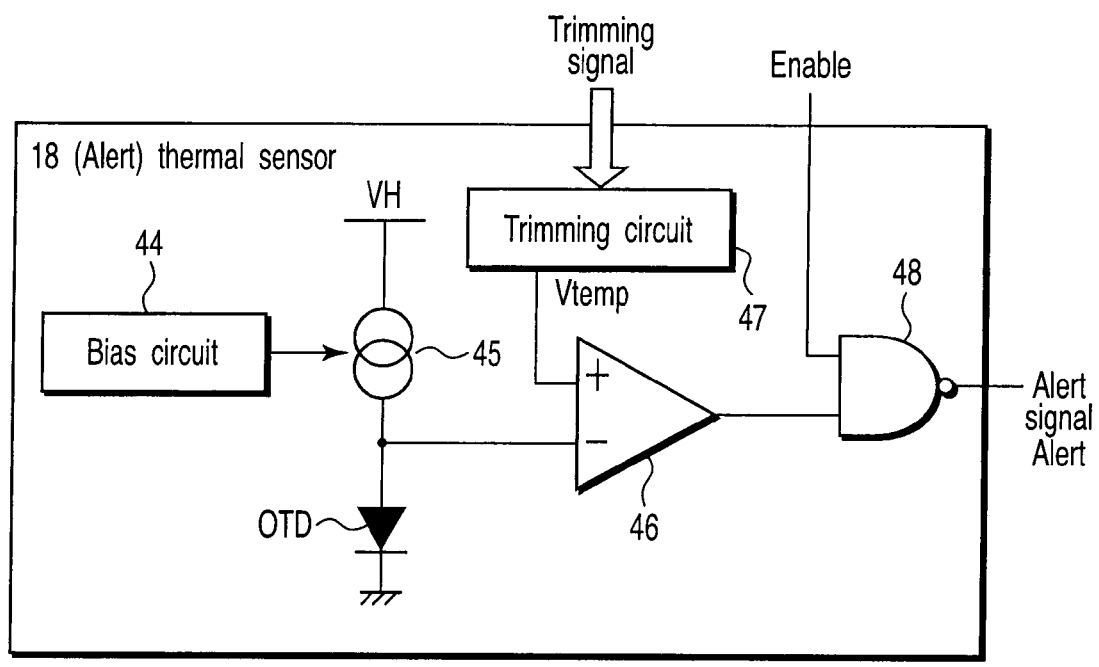
F I G. 17

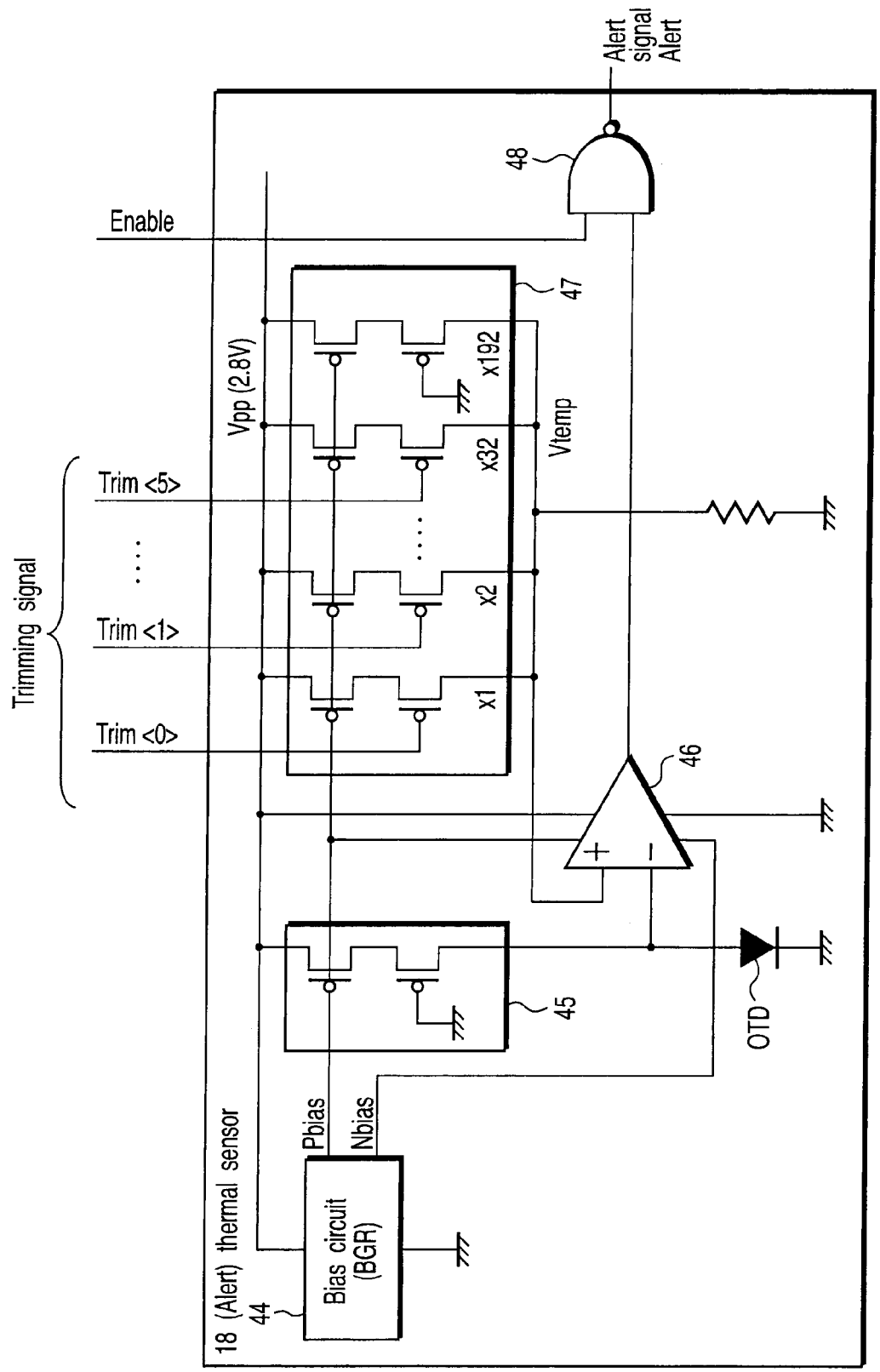
F I G. 18

SEMICONDUCTOR INTEGRATED CIRCUIT

CROSS-REFERENCE TO RELATED APPLICATIONS

This is a divisional of U.S. application Ser. No. 11/261,536 filed Oct. 31, 2005, which in turn is a Continuation Application of PCT Application No. PCT/JP2005/016353, filed Aug. 31, 2005, which was published under PCT Article 21(2) in English, the entire contents of each of which are incorporated herein by reference.

BACKGROUND OF THE INVENTION

1. Field of the Invention

The present invention relates to the trimming of the temperature control contents of an on-chip thermal sensor (thermometer assembled in a chip).

2. Description of the Related Art

Highly efficient semiconductor integrated circuits execute computations in parallel with each other at a high speed, from which a problem arises in that a chip temperature is increased.

When the chip temperature becomes higher than a certain limit, the transistors in the chip becomes in danger of breakage or firing. Therefore, technologies for controlling the chip temperature and preventing these failures of transistors are required.

One of the technologies is to assemble a thermal sensor in a semiconductor integrated circuit and to reduce a computation speed or stops a computation itself when a chip temperature exceeds a predetermined value (refer to, for example, Jpn. Pat. Appln. KOKAI Publication No. 10-41466).

In the technology, a trimming data which determines the temperature control contents of a thermal sensor is stored in a fuse circuit after a trimming test is executed to calibrate the temperature of the thermal sensor, for example, before a product is shipped.

However, in a conventional trimming test, since a signal path used in a normal operation is used as it is, a power source voltage is supplied to a core in a chip in a test. Accordingly, the test cannot be executed accurately due to the heat generated by a leakage occurring in the core.

BRIEF SUMMARY OF THE INVENTION

A semiconductor integrated circuit according to an aspect of the present invention is applied to a system using a first power source voltage and a second power source voltage independent of the first power source voltage and has a first area to which the first power source voltage is supplied, a thermal sensor disposed in the first area, and a first input path which supplies trimming data that determines the control contents of the thermal sensor to the thermal sensor, and is disposed in the first area.

BRIEF DESCRIPTION OF THE SEVERAL VIEWS OF THE DRAWING

FIG. 2 is a view showing a semiconductor integrated circuit as a reference example;

FIG. 5 is a view showing a semiconductor integrated circuit of a third embodiment of the invention;

FIG. 17 is a view showing an example of a thermal sensor; and

FIG. 18 is a view showing the example of the thermal sensor.

DETAILED DESCRIPTION OF THE INVENTION

A semiconductor integrated circuit of an aspect of the present invention will be described below in detail with reference to the accompanying drawing.

1. Outline

In the examples of the present invention, first, a power source of a thermal sensor is provided separately from a power source of a core so that a power source voltage supplied to the thermal sensor is independent of a power source voltage supplied to the core.

Second, an input path is provided to input trimming data to the thermal sensor without passing through the core.

With the above arrangement, since a trimming test can be executed for temperature calibration in the state in which no power source voltage is supplied to the core, an accurate trimming test can be realized without generating heat in the core in the trimming test.

2. Embodiments

Next, several embodiments which are thought to be best will be explained below.

Note that, in the following description, a term "inside of a chip" means the entire area on a chip, and a term "outside of a chip" means the area other than the entire area on the chip. Specifically, when this is examined as to an integrated circuit, the inside of a chip is discriminated from the outside of the chip in terms of a pad (terminal) as a boundary (the position of the pad belongs to the inside of the chip).

(1) First Embodiment

Figure 1:
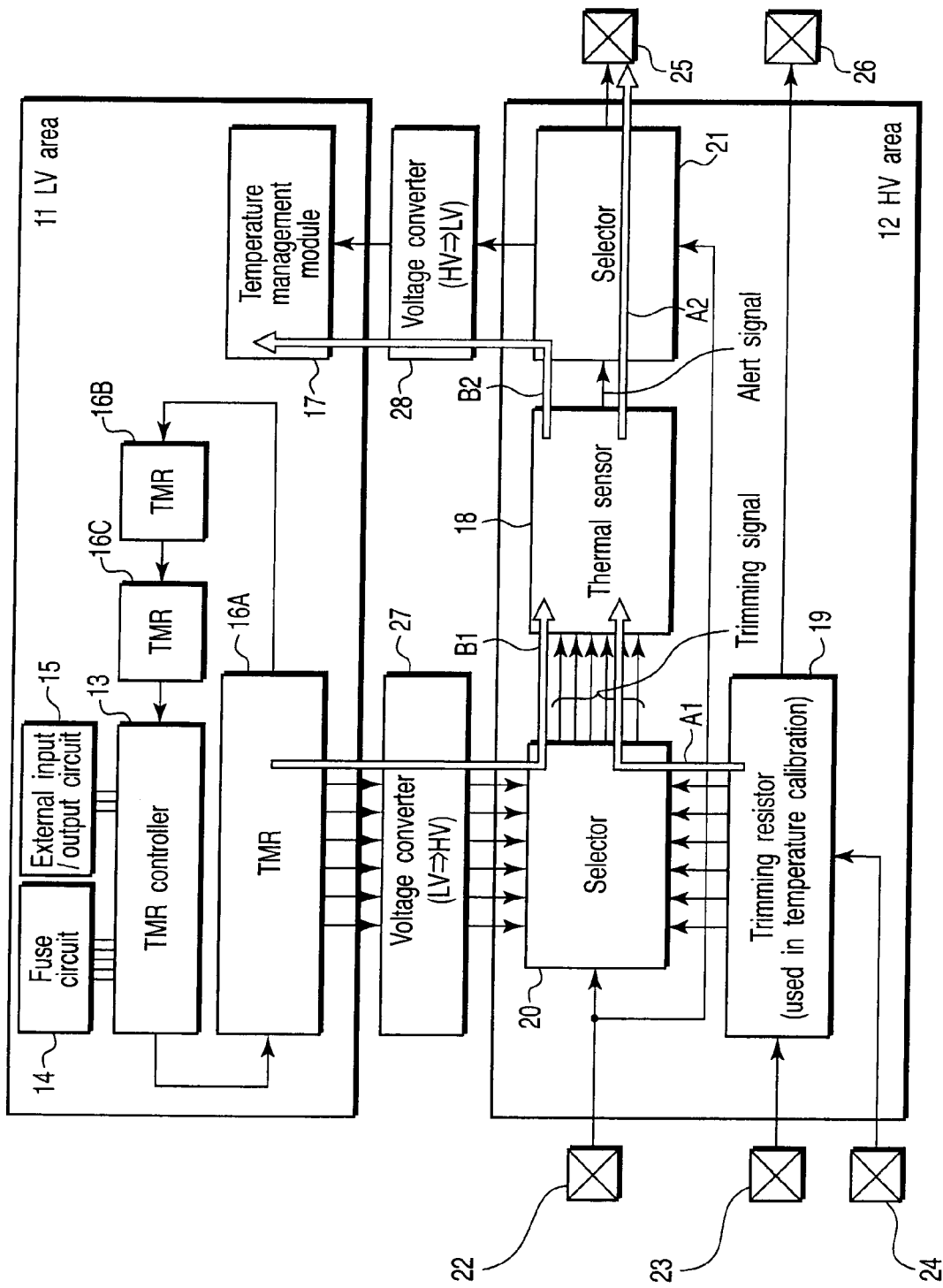
FIG. 1 is a view showing a semiconductor integrated circuit of a first embodiment of the invention.

FIG. 1 shows a semiconductor integrated circuit according to a first embodiment.

The semiconductor integrated circuit according to the first embodiment is composed of an LV (low voltage) area 11, an HV (high voltage) area 12, and voltage converters 27 and 28 acting as interfaces thereof.

The LV area 11 is an area to which a first power source voltage is supplied and includes, for example, a computing unit (data path unit) and various control circuits. The HV area 12 is an area to which a second power source voltage higher than the first power source voltage is supplied and includes a thermal sensor 18. Since the first and second power source voltages are generated by different power sources, they are independent of each other.

The LV area 11 has a trimming register controller 13, a fuse circuit (fuse box) 14, an external input/output circuit 15, a trimming registers 16A, 16B, and 16C, and a temperature management module 17 disposed therein.

The fuse circuit 14 stores trimming data determined by temperature calibration executed before shipment. The trimming register controller 13 and the trimming registers 16A, 16B, and 16C are connected to each other in series in a ring shape and constitute a serial transfer path of the trimming data.

The trimming register 16A holds the trimming data for adjusting the thermal sensor 18 loaded from the fuse circuit 14 in a normal operation.

As to the trimming registers 16B and 16C, when, for example, a plurality of thermal sensors exist, they may be used as resistors which hold the trimming data used to adjust them, or when there exist circuit blocks to be adjusted other than the thermal sensors, the trimming registers 16B and 16C may be used as resistors which hold the trimming data to adjust the circuit blocks.

The temperature management module 17 reduces the operation speed of the computing unit (clock frequency supplied to the computing unit) or stops the computation itself of the computing unit (clock signal) based on an alert signal Alert (chip temperature) detected by, for example, the thermal sensor 18.

The HV area 12 has the thermal sensor 18, a trimming resistor 19, and selectors 20 and 21 disposed therein.

The thermal sensor 18 is provided to manage the temperature in the LV area 11 and composed of, for example, an alert circuit.

The alert circuit detects a chip temperature increase by comparing a reference potential, which has no temperature dependency, created by a band gap reference (BGR) circuit with a turn-on voltage (Vf) of a junction diode which has temperature dependency and outputs the alert signal Alert.

When the alert circuit is used in the thermal sensor 18, the value of a power source voltage which drives the thermal sensor 18 cannot be made equal to or less than the turn-on voltage (Vf) of the junction diode. This is one of the reasons why the thermal sensor 18 is disposed in the HV area 12.

The trimming resistor 19 is connected to a data input terminal 23, a resistor control signal input terminal 24, and a data output terminal 26.

In a trimming test (temperature calibration), the trimming data of the thermal sensor 18 is input to the data input terminal 23 from the outside of a chip. The trimming data is directly supplied to the thermal sensor 18 through a first input path (arrow A1) from the data input terminal 23 to the thermal sensor 18 without passing through the LV area 11.

Note that, in the normal operation, the trimming data of the thermal sensor 18 stored in the fuse circuit 14 is transferred to the thermal sensor 18 through a second input path (arrow B1) from the fuse circuit 14 to the thermal sensor 18.

The selector 20 is connected to a mode selection input terminal 22, and the selector 21 is connected to an alert output terminal 25.

When a test mode signal is input to the mode selection input terminal 22, since the selector 20 selects the first input path from the data input terminal 23 to the thermal sensor 18, the trimming data is input to the thermal sensor 18 from the outside of the chip.

At this time, the selector 21 selects a first output path (arrow A2) to output the alert signal output from the thermal sensor 18 to the outside of the chip through the alert output terminal 25 without passing through the LV area 11.

When a normal operation mode signal is input to the mode selection input terminal 22, since the selector 20 selects the second input path from the fuse circuit 14 to the thermal sensor 18 through the voltage converter 27, the trimming data stored in the fuse circuit 14 is transferred to the thermal sensor 18.

At this time, the selector 21 selects a second output path (arrow B2) from the thermal sensor 18 to the temperature management module 17 through the voltage converter 28 to transfer the alert signal Alert output from the thermal sensor 18 to the temperature management module 17 in the LV area 11.

The data output terminal 26 is a terminal to output the trimming data held in the trimming resistor 19 to the outside of the chip without passing through the LV area 11 in the trimming test.

According to the semiconductor integrated circuit arranged as described above, in the trimming test for the temperature calibration executed before a product is shipped, the trimming data can be transferred through the first input path, which runs from the data input terminal 23 to the thermal sensor 18 through the trimming resistor 19 and the selector 20, without passing through the LV area 11 as shown by the arrow A1.

Further, in the trimming test, the alert signal Alert detected by the thermal sensor 18 and indicating a chip temperature can be also output to the outside of the chip through the first output path, which runs from the thermal sensor 18 to the alert output terminal 25 through the selector 21, without passing through the LV area 11 as shown by the arrow A2.

Accordingly, since the trimming test can be executed in the state in which no power source voltage is supplied to the LV area 11, no heat is generated in the LV area 11 in the trimming test, thereby an accurate trimming test can be realized.

For reference, FIG. 2 shows a semiconductor integrated circuit acting as the basis of the example of the present invention. In this case, in the trimming test, the trimming data is input from an external input/output circuit 15, and, in a normal operation, the trimming data stored in a fuse circuit 14 is loaded.

In any mode, the trimming data is transferred from an LV area 11 to an HV area 12, and an alert signal Alert is transferred from the HV area 12 to the LV area 11 (arrows C1 and C2).

In particular, since a power source voltage must be also supplied to the LV area 11 in addition to the HV area 12 in the trimming test, the accuracy of the temperature calibration is deteriorated by the heat due to the leakage current generated in the LV area 11.

Note that, in the example of the present invention, the method of loading the trimming data in the normal operation is not limited to the method of loading them from the fuse circuit 14. For example, the trimming data may be loaded from a ROM outside of the chip in an initialization process or may be loaded from a test pin.

As described above, according to the semiconductor integrated circuit of the first embodiment, since the trimming test of the thermal sensor can be accurately executed, the performance and the reliability of the chip can be enhanced.

(2) Second Embodiment

A second embodiment is an example of the first embodiment and relates to a method of applying power source voltages to an LV area and an HV area.

As described in the section of the outline, in the example of the present invention, the power source of a thermal sensor is arranged separately from the power source to a core so that the power source voltage supplied to the thermal sensor is independent of the power source voltage supplied to the core.

Figure 3:
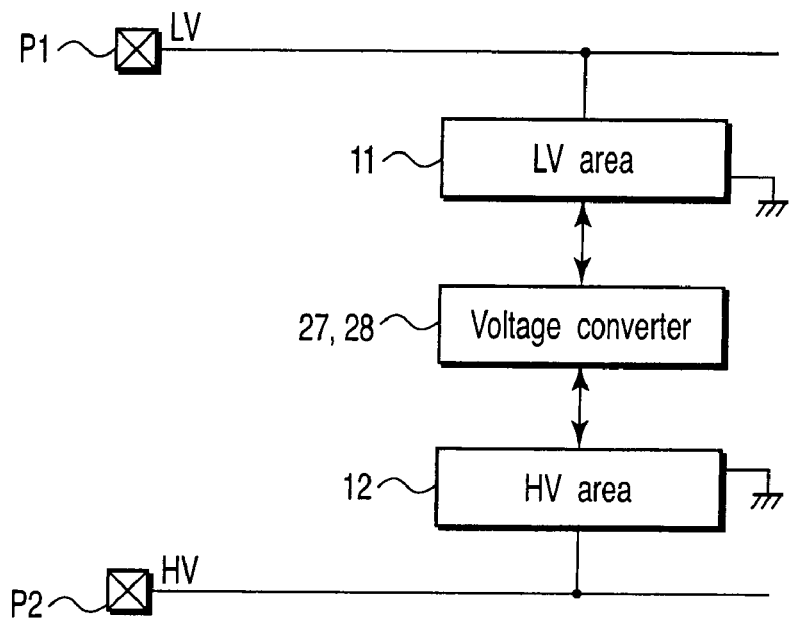
FIG. 3 is a view showing a semiconductor integrated circuit of a second embodiment of the invention.

To supply the power source voltage to the thermal sensor independently of the power source voltage supplied to the core, an LV area 11 including the core (for example, ALU (arithmetic and logic unit)) may be connected to a power source terminal P1, and an HV area 12 including the thermal sensor may be connected to a power source terminal P2 different from the power source terminal P1 as shown in, for example, FIG. 3.

In this case, in the trimming test executed before the product is shipped, the power source terminal P1 is placed in an open state and a power source voltage HV is supplied to the power source terminal P2, thereby the trimming test of the thermal sensor in the HV area 12 can be executed without supplying a power source voltage LV to the LV area 11.

Note that after the product is shipped, the normal operation can be executed by supplying the power source voltage LV to the power source terminal P1 and the power source voltage HV to the power source terminal P2.

Figure 4:
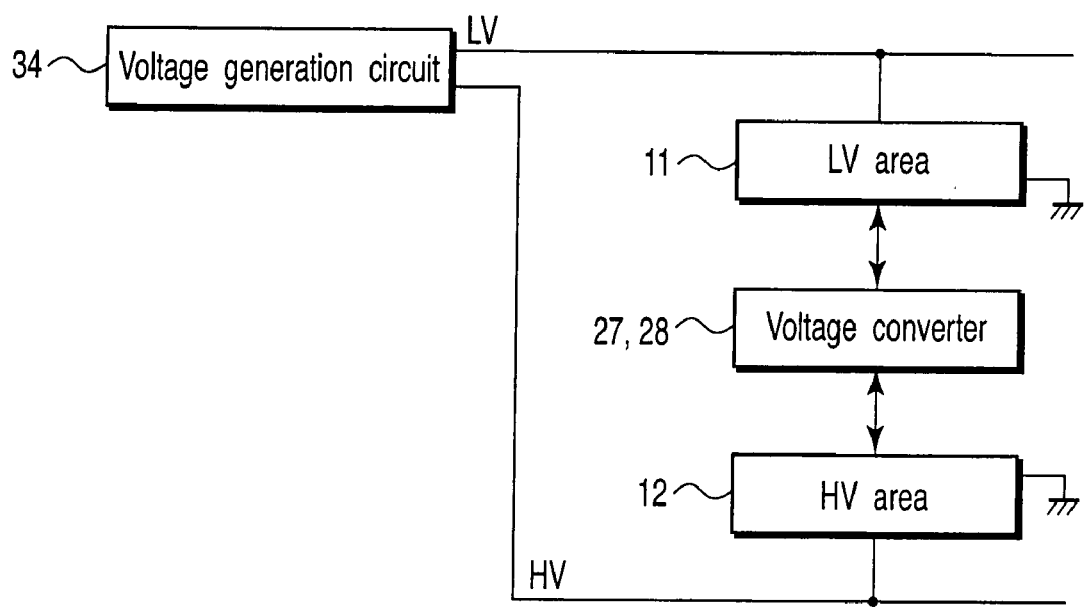
FIG. 4 is a view showing the semiconductor integrated circuit of the second embodiment.

Further, to supply the power source voltage to the thermal sensor independently of the power source voltage supplied to the core, a voltage generation circuit 34 may be disposed in the chip to control the generation/shut off of the power source voltage LV and the generation/shut off of the power source voltage HV independently of each other, respectively as shown in, for example, FIG. 4.

In this case, in the trimming test executed before the product is shipped, the power source voltage LV is shut off or set to 0V and the power source voltage HV is generated by the voltage generation circuit 34, thereby the trimming test of the thermal sensor in the HV area 12 can be executed without supplying the power source voltage LV to the LV area 11.

Note that after the product is shipped, the normal operation can be executed by supplying the power source voltage LV to the LV area 11 and the power source voltage HV to the HV area 12.

(3) Third Embodiment

A third embodiment is a modification of the first embodiment and has a feature in that only a power source voltage Vcc is used. That is, the third embodiment relates to a semiconductor integrated circuit in the first embodiment when the first power source voltage is equal to the second power source voltage.

FIG. 5 shows the semiconductor integrated circuit according to the third embodiment.

The semiconductor integrated circuit according to the third embodiment is composed of a core area 11A and a sensor area 12A. The third embodiment has no voltage converter acting as an interface between the both areas because only the power source voltage Vcc is used.

The core area 11A is an area including an arithmetic unit (ex. ALU), various control circuits, and so on, and the sensor area 12A is an area in which a thermal sensor 18 is disposed. Although only the one kind (Vcc) of the power source voltage is used, a first power source voltage supplied to the core area 11A is independent of a second power source voltage supplied to the sensor area 12A.

The core area 11A has a trimming register controller 13, a fuse circuit 14, an external input/output circuit 15, trimming registers 16A, 16B, and 16C, and a temperature management module 17 disposed therein.

The fuse circuit 14 stores trimming data determined by temperature calibration executed before shipment. The trimming register controller 13 and the trimming registers 16A, 16B, and 16C are connected to each other in series in a ring shape and constitute a serial transfer path of the trimming data.

The trimming register 16A holds the trimming data to adjust the thermal sensor 18 loaded from the fuse circuit 14 in a normal operation.

As to the trimming registers 16B and 16C, when, for example, a plurality of thermal sensors exist, they may be used as resistors which hold the trimming data used to adjust them, or when there exist circuit blocks to be adjusted other than the thermal sensors, the trimming registers 16B and 16C may be used as resistors which hold the trimming data to adjust the circuit blocks.

The temperature management module 17 reduces the operation speed of the computing unit (clock frequency supplied to the computing unit) or stops the computation itself of the computing unit (clock signal) based on an alert signal Alert (chip temperature) detected by, for example, the thermal sensor 18.

The sensor area 12A has the thermal sensor 18, a trimming resistor 19, and selectors 20 and 21 disposed therein.

The thermal sensor 18 is provided to manage the temperature in an LV area 11 and composed of, for example, an alert circuit.

The trimming resistor 19 is connected to a data input terminal 23, a resistor control signal input terminal 24, and a data output terminal 26.

In a trimming test (temperature calibration), the trimming data of the thermal sensor 18 is input to the data input terminal 23 from the outside of a chip. The is directly supplied to the thermal sensor 18 through a first input path (arrow A1) from the data input terminal 23 to the thermal sensor 18 without though the core area 11A.

Note that, in the normal operation, the trimming data of the thermal sensor 18 stored in the fuse circuit 14 is supplied to the thermal sensor 18 through a second input path (arrow B1) from the fuse circuit 14 to the thermal sensor 18.

The selector 20 is connected to a mode selection input terminal 22, and the selector 21 is connected to an alert output terminal 25.

When a test mode signal is input to the mode selection input terminal 22, since the selector 20 selects the first input path from the data input terminal 23 to the thermal sensor 18, the trimming data is input to the thermal sensor 18 from the outside of the chip.

At this time, the selector 21 selects a first output path (arrow A2) to output the alert signal Alert output from the thermal sensor 18 to the outside of the chip through the alert output terminal 25 without passing through the core area 11A.

When a normal operation mode signal is input to the mode selection input terminal 22, since the selector 20 selects the second input path from the fuse circuit 14 to the thermal sensor 18, the trimming data stored in the fuse circuit 14 is supplied to the thermal sensor 18.

At this time, the selector 21 selects a second output path (arrow B2) from the thermal sensor 18 to the temperature management module 17 to transfer the alert signal Alert output from the thermal sensor 18 to the temperature management module 17 in the core area 11A.

The data output terminal 26 is a terminal to output the trimming data held in the trimming resistor 19 to the outside of the chip without passing through the core area 11A in the trimming test.

The same advantage as that of the first embodiment can be also obtained in the semiconductor integrated circuit arranged as described above.

(4) Fourth Embodiment

A fourth embodiment shows examples of the third embodiment and relates to a method of applying power source voltages the core area and the sensor area.

Figure 6:
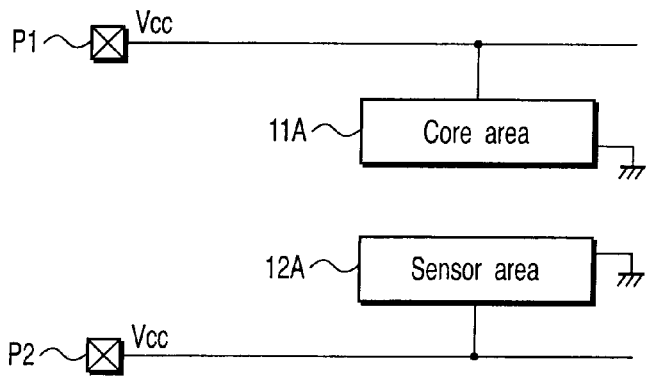
FIG. 6 is a view showing a semiconductor integrated circuit of a fourth embodiment of the invention.

In the example shown in FIG. 6, to supply a power source voltage to the sensor area independently of a power source voltage supplied to the core area, a core area 11A is connected to a power source terminal P1 and a sensor area 12A is connected to a power source terminal P2 different from the power source terminal P1.

With this arrangement, in a trimming test executed before a product is shipped, the power source terminal P1 is placed in an open state, and a power source voltage HV can be supplied to the power source terminal P2, thereby the trimming test of a thermal sensor in the sensor area 12A can be executed without supplying a power source voltage Vcc to the core area 11A.

Note that after the product is shipped, the normal operation can be executed by supplying the power source voltage Vcc to the power source terminals P1 and P2.

Figure 7:
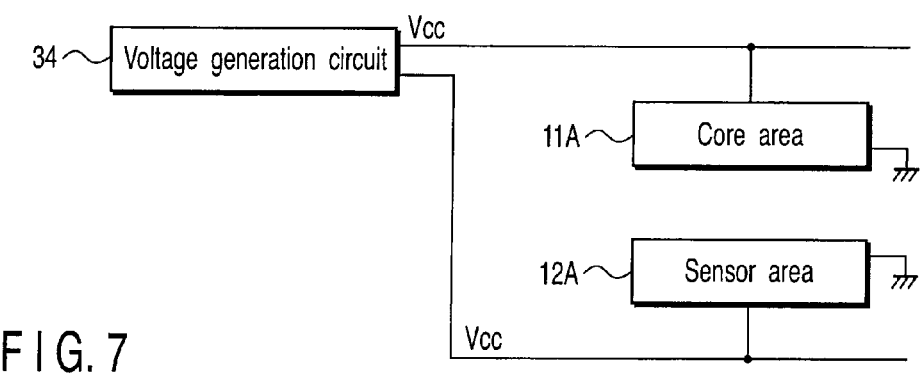
FIG. 7 is a view showing the semiconductor integrated circuit of the fourth embodiment.

Further, in the example shown in FIG. 7, to supply the power source voltage to the sensor area independently of the power source voltage supplied to the core area, a voltage generation circuit 34 is disposed in a chip to control the generation/shut off of the power source voltage Vcc to the core area 11A and the generation/shut off of the power source voltage Vcc to the sensor area 12A independently of each other.

With this arrangement, in the trimming test executed before the product is shipped, the power source voltage Vcc to the core area 11A is shut off or set to 0V and the power source voltage Vcc to the sensor area 12A is generated by the voltage generation circuit 34, thereby the trimming test of the thermal sensor in the sensor area 12A can be executed without supplying the power source voltage Vcc to the core area 11A.

Note that after the product is shipped, the normal operation can be executed by supplying the power source voltage Vcc to both the core area 11A and the sensor area 12A.

(5) Fifth Embodiment

A fifth embodiment is a modification of the first to fourth embodiments and relates to a layout of a thermal sensor in a chip and to a circuit arrangement when a plurality of thermal sensors are disposed in the chip.

Figure 8:
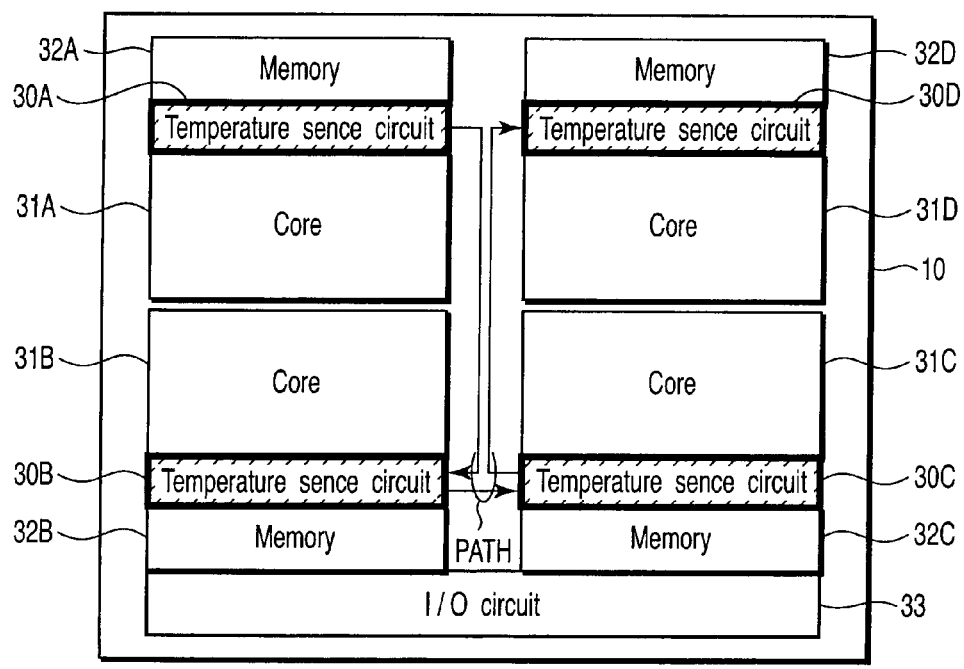
FIG. 8 is a view showing a chip layout of a fifth embodiment of the invention.

FIG. 8 shows a chip layout according to the fifth embodiment.

Four cores 31A, 31B, 31C, and 31D, four memories 32A, 32B, 32C, and 32D corresponding to these cores 31A, 31B, 31C, and 31D in a one-to-one relation, and I/O (input/output) circuit 33 are disposed on a chip 10.

Temperature sense circuits 30A, 30B, 30C, and 30D each including the thermal sensor are interposed between the cores 31A, 31B, 31C, and 31D and the memories 32A, 32B, 32C, and 32D. The temperature sense circuits 30A, 30B, 30C, and 30D are connected in series to each other by, for example, a signal path PATH.

Each of the cores 31A, 31B, 31C, and 31D includes arithmetic units in a processor such as a graphics processing unit (GPU) and a central processing unit (CPU). Further, the memories 32A, 32B, 32C, and 32D are, for example, embedded DRAMs (eDRAMs).

A detection circuit such as an on-chip thermal diode (OTD) and an alert circuit can be used as the thermal sensor in the temperature sense circuits 30A, 30B, 30C, and 30D. The temperature sense circuits 30A, 30B, 30C, and 30D are placed in the HV area in the first and second embodiments or in the sensor area in the third and fourth embodiments.

The signal path PATH is also disposed in the HV area or in the sensor area. That is, circuits (repeater and the like), which require the power source voltage LV supplied to the LV area or the core area, do not exist in the signal path PATH.

FIGS. 9 to 12 show a semiconductor integrated circuit according to the fifth embodiment.

Figure 9:
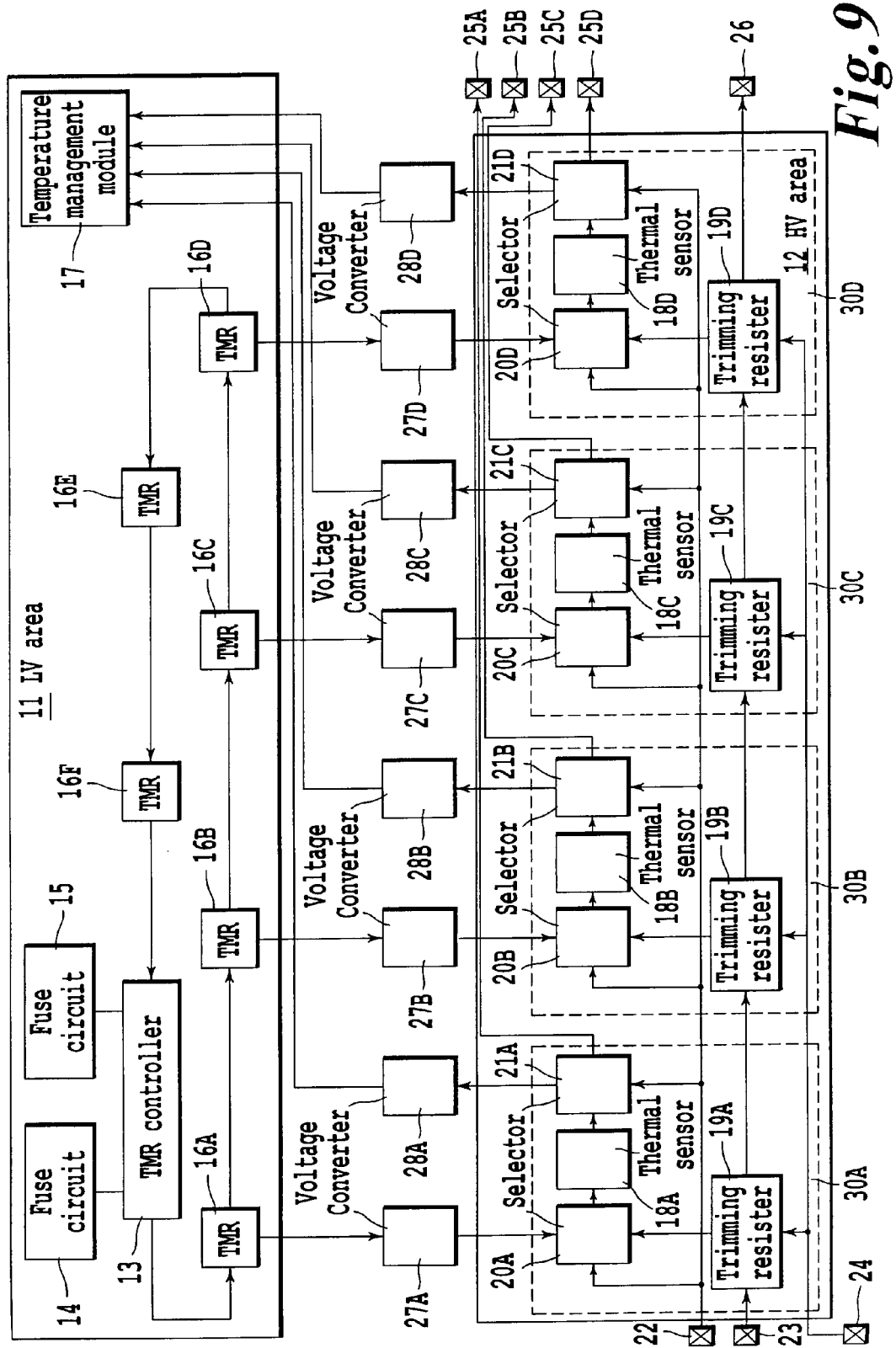
FIG. 9 is a view showing a semiconductor integrated circuit of the fifth embodiment.
Figure 10:
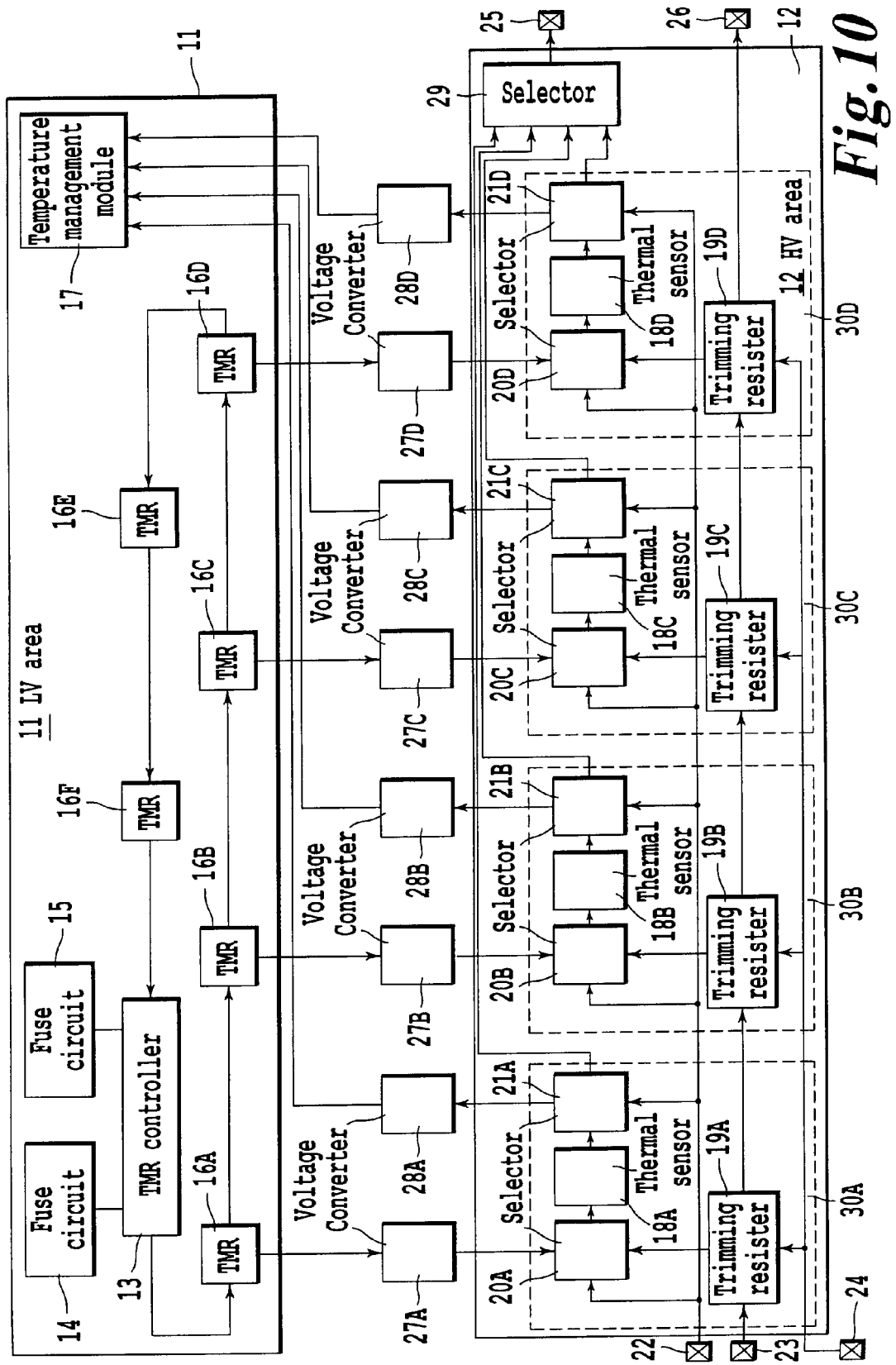
FIG. 10 is a view showing the semiconductor integrated circuit of the fifth embodiment.

FIGS. 9 and 10 correspond to the modifications of the first and second embodiments, and the same components as those shown in FIGS. 1, 3, 4, and 8 are denoted by the same reference numerals as those used in these figures. Further, FIGS. 11 and 12 correspond to the modifications of the third and fourth embodiments, and the same components as those shown in FIGS. 5, 6, 7, and 8 are denoted by the same reference numerals as those used in these figures.

An LV area 11 and a core area 11A have a trimming register controller 13, a fuse circuit 14, an external input/output circuit 15, trimming registers 16A, 16B, 16C, 16D, 16E, and 16F, and a temperature management module 17 disposed therein, respectively.

The fuse circuit 14 stores trimming data determined by temperature calibration executed before shipment. The trimming register controller 13 and the trimming registers 16A, 16B, 16C, 16D, 16E, and 16F are connected to each other in series in a ring shape and constitute a serial transfer path of the trimming data.

In a normal operation, the trimming registers 16A, 16B, 16C, and 16D hold the trimming data loaded from the fuse circuit 14 to adjust thermal sensors 18A, 18B, 18C, and 18D. The trimming resistors 16E and 16F are resistors which hold the trimming data used to adjust circuits blocks other than the thermal sensors.

The temperature management module 17 reduces the operation speed of the computing unit (clock frequency supplied to the computing unit) or stops the computation itself of the computing unit (clock signal) based on an alert signal Alert (chip temperature) detected by, for example, the thermal sensors 18A, 18B, 18C, and 18D.

An HV area 12 and a sensor area 12A have the thermal sensors 18A, 18B, 18C, and 18D, trimming resistors 19A, 19B, 19C, and 19D, and selectors 20A, 20B, 20C, 20D, 21A, 21B, 21C, and 21D.

The trimming resistors 19A, 19B, 19C, and 19D hold the trimming data input from the outside of a chip through a data input terminal 23 in the trimming test (temperature calibration). The trimming resistors 19A, 19B, 19C, and 19D are connected in series between the data input terminal 23 and a data output terminal 26 and constitute a serial transfer path of the trimming data.

In the trimming test, the trimming data of the thermal sensors 18A, 18B, 18C, and 18D are input from the data input terminal 23. The trimming data are transferred to the respective thermal sensors 18A, 18B, 18C, and 18D through a first input path, which runs from the data input terminal 23 to the thermal sensors 18A, 18B, 18C, and 18D, without passing through the LV area 11 or the core area 11A.

In the normal operation, the trimming data of the thermal sensors 18A, 18B, 18C, and 18D stored in the fuse circuit 14 are transferred to the respective thermal sensors 18A, 18B, 18C, and 18D through a second input path, which runs from the fuse circuit 14 to the thermal sensors 18A, 18B, 18C, and 18D.

Figure 11:
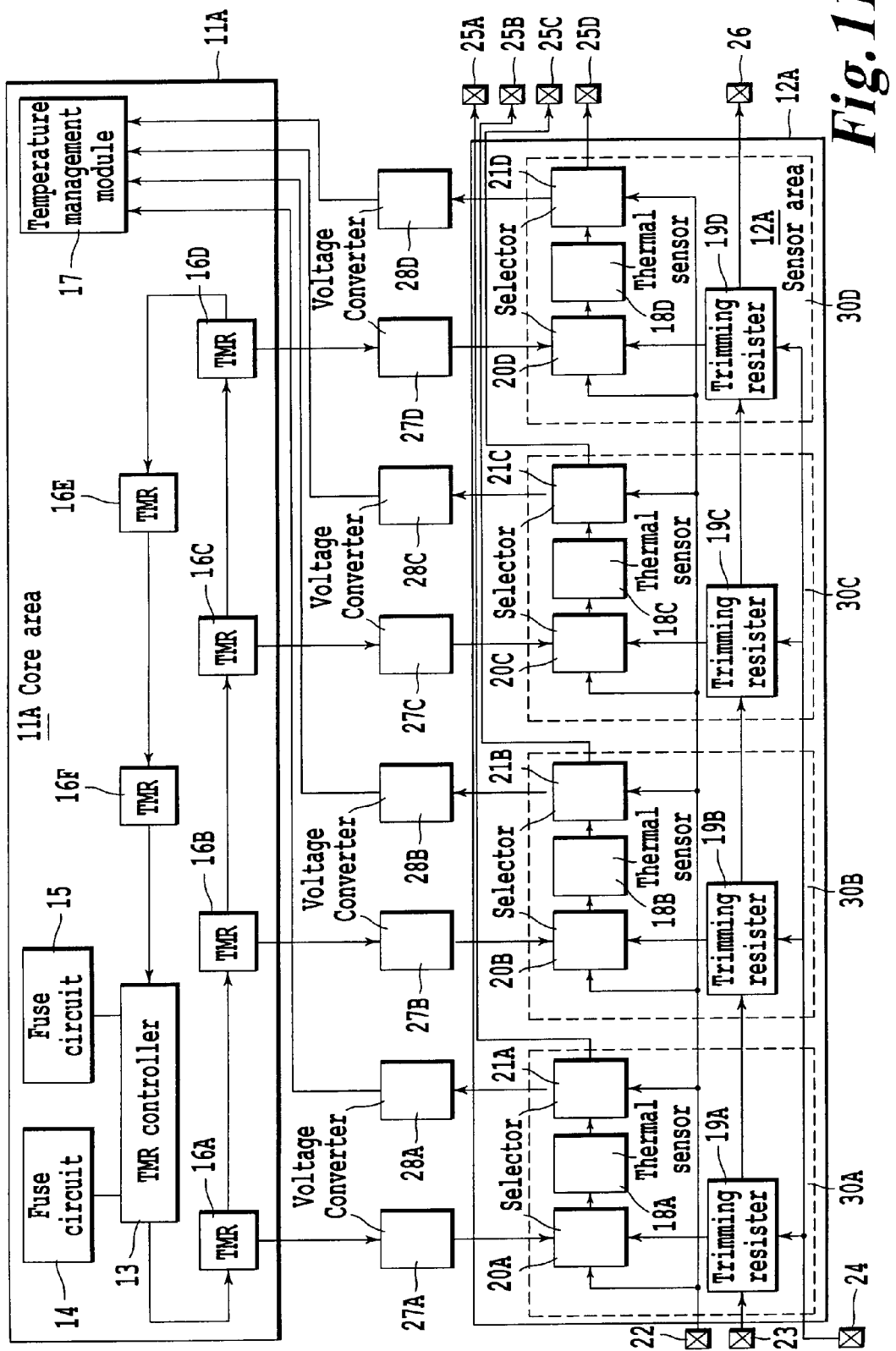
FIG. 11 is a view showing the semiconductor integrated circuit of the fifth embodiment.
Figure 12:
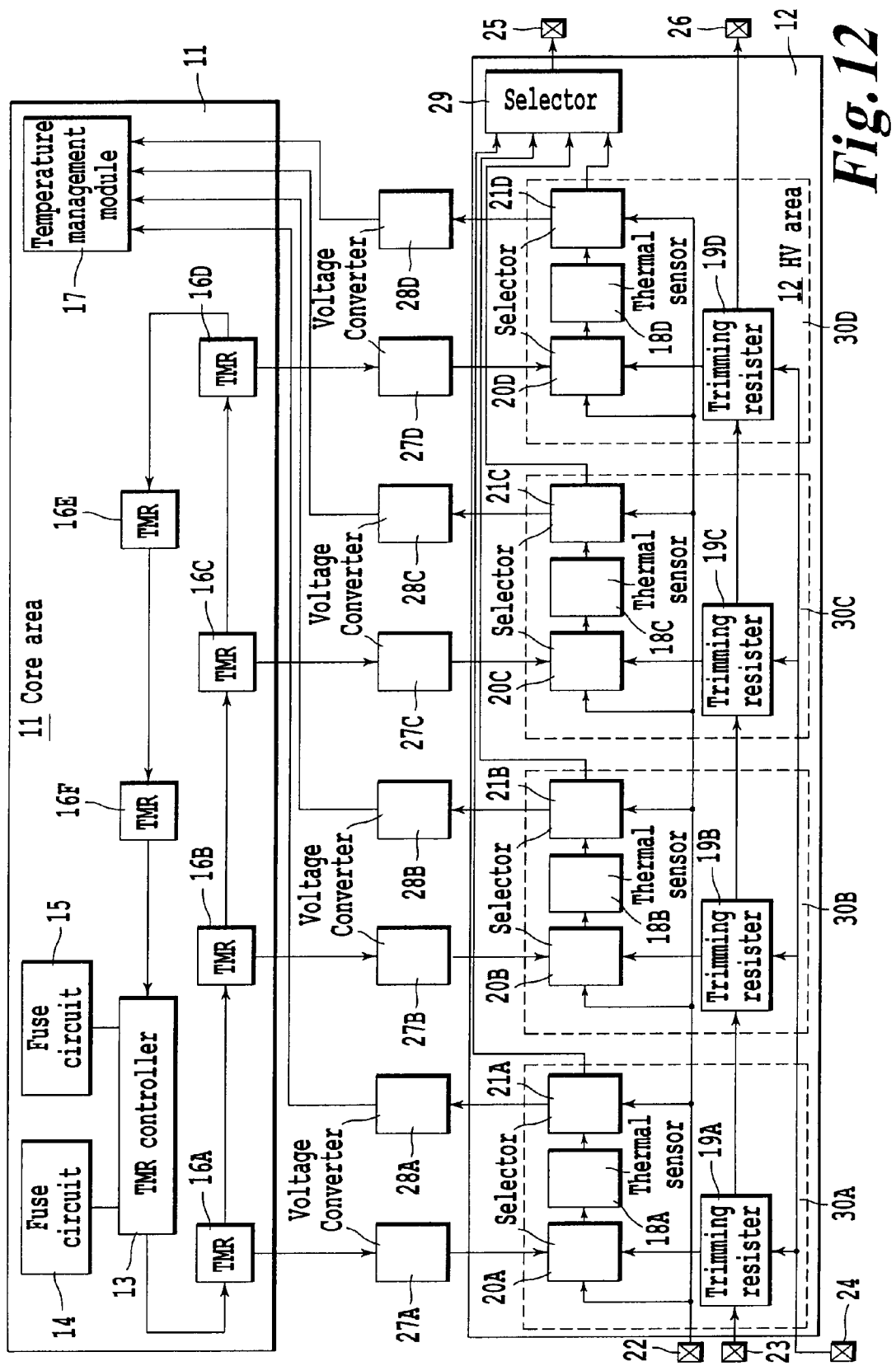
FIG. 12 is a view showing the semiconductor integrated circuit of the fifth embodiment.

The selectors 20A, 20B, 20C, and 20D are connected to a mode selection input terminal 22. The selectors 21A, 21B, 21C, and 21D may be connected to alert output terminals 25A, 25B, 25C, and 25D, respectively as shown in FIGS. 9 and 11 or may be connected to a single common alert output terminal 25 through a selector 29 as shown in FIGS. 10 and 12.

When a test mode signal is input to the mode selection input terminal 22, since the selectors 20A, 20B, 20C, and 20D select the first input path from the data input terminal 23 to the thermal sensors 18A, 18B, 18C, and 18D, the trimming data are input to the thermal sensors 18A, 18B, 18C, and 18D, respectively from the outside of the chip.

At this time, the selectors 21A, 21B, 21C, and 21D select the first output path to output the alert signals Alert output from the thermal sensors 18A, 18B, 18C, and 18D to the outside of the chip through the alert output terminals 25, 25A, 25B, 25C, and 25D without passing through the LV area 11 or the core area 11A.

When a normal operation mode signal is input to the mode selection input terminal 22, since the selectors 20A, 20B, 20C, and 20D select the second input path which runs from the fuse circuit 14 to the thermal sensors 18A, 18B, 18C, and 18D through voltage converters 27A, 27B, 27C, and 27D, the trimming data stored in the fuse circuit 14 is transferred to the thermal sensors 18A, 18B, 18C, and 18D, respectively.

At this time, the selectors 21A, 21B, 21C, and 21D select a second output path which runs from the thermal sensors 18A, 18B, 18C, and 18D to the temperature management module 17 through voltage converters 28A, 28B, 28C, and 28D to transfer the alert signals Alert output from the thermal sensors 18A, 18B, 18C, and 18D to the temperature management module 17 in the LV area 11 or the core area 11A.

The data output terminal 26 is a terminal to output the trimming data held in the trimming resistors 19A, 19B, 19C, and 19D to the outside of the chip without passing through the LV area 11 or the core area 11A in the trimming test.

Since the semiconductor integrated circuit arranged as described above can dispose a plurality of thermal sensors in the chip, it can more accurately manage the temperature in the chip, in addition to the same advantages as those of the first to fourth embodiments.

(6) Sixth to Eighth Embodiments

Sixth to eighth embodiments are modifications of the fifth embodiment and relates to the layout of thermal sensors in a chip.

Figure 13:
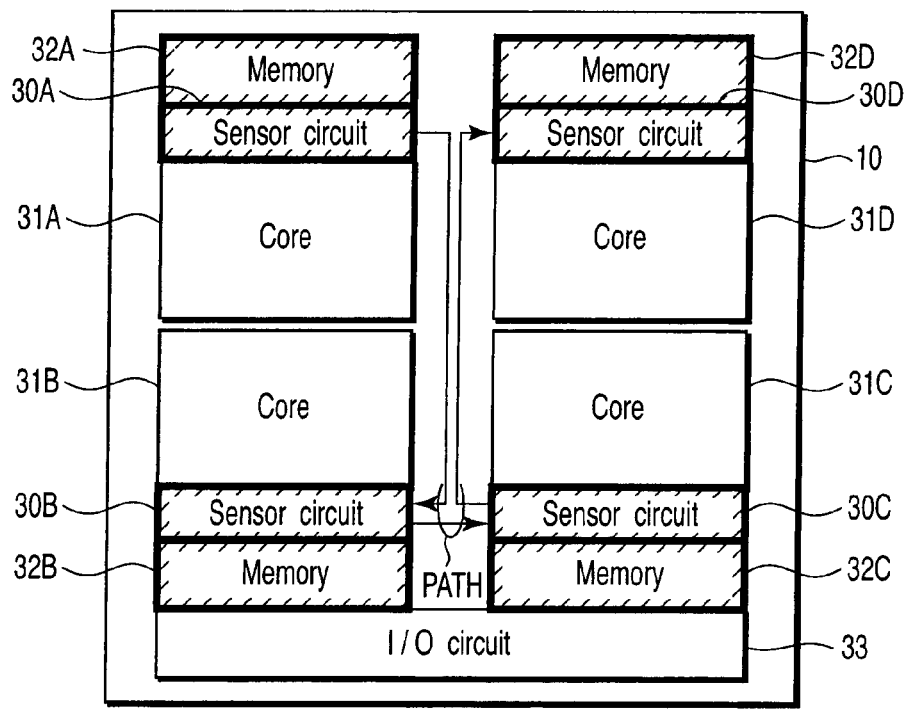
FIG. 13 is a view showing a chip layout of a sixth embodiment of the invention.

FIG. 13 shows a chip layout according to the sixth embodiment.

In the sixth embodiment, the power source of temperature sense circuits 30A, 30B, 30C, and 30D is shared by memories (embedded DRAMs) 32A, 32B, 32C, and 32D. Accordingly, the memories 32A, 32B, 32C, and 32D are disposed in the HV area in the first and second embodiments or in the sensor area in the third and fourth embodiments like the temperature sense circuits 30A, 30B, 30C, and 30D.

This embodiment is effective when the voltage of the power source of the memories 32A, 32B, 32C, and 32D cannot be reduced. The power source can be easily shared by the temperature sense circuits 30A, 30B, 30C, and 30D and the memories 32A, 32B, 32C, and 32D by disposing them adjacent to each other.

Figure 14:
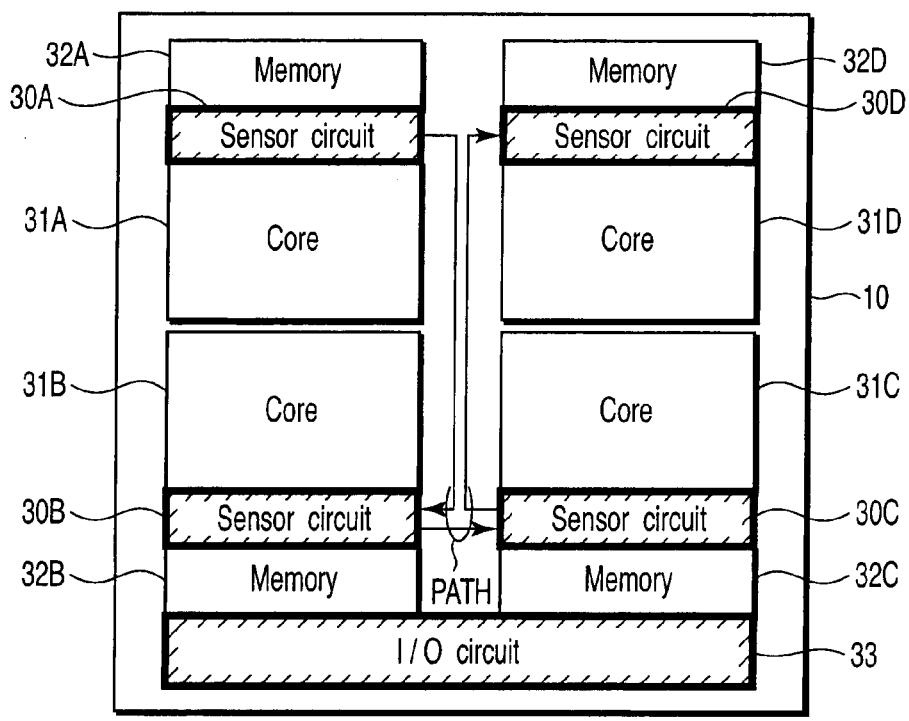
FIG. 14 is a view showing a chip layout of a seventh embodiment of the invention.

FIG. 14 shows a chip layout according to a seventh embodiment.

In the seventh embodiment, the power source of temperature sense circuits 30A, 30B, 30C, and 30D is shared by an I/O circuit 33. Accordingly, the I/O circuit 33 is disposed in the HV area in the first and second embodiments or in the sensor area in the third and fourth embodiments like the temperature sense circuits 30A, 30B, 30C, and 30D.

This embodiment is effective when the power source of the I/O circuit 33 cannot be reduced. The power source can be easily shared by disposing the temperature sense circuits 30A, 30B, 30C, and 30D in the vicinity of the I/O circuit 33.

Figure 15:
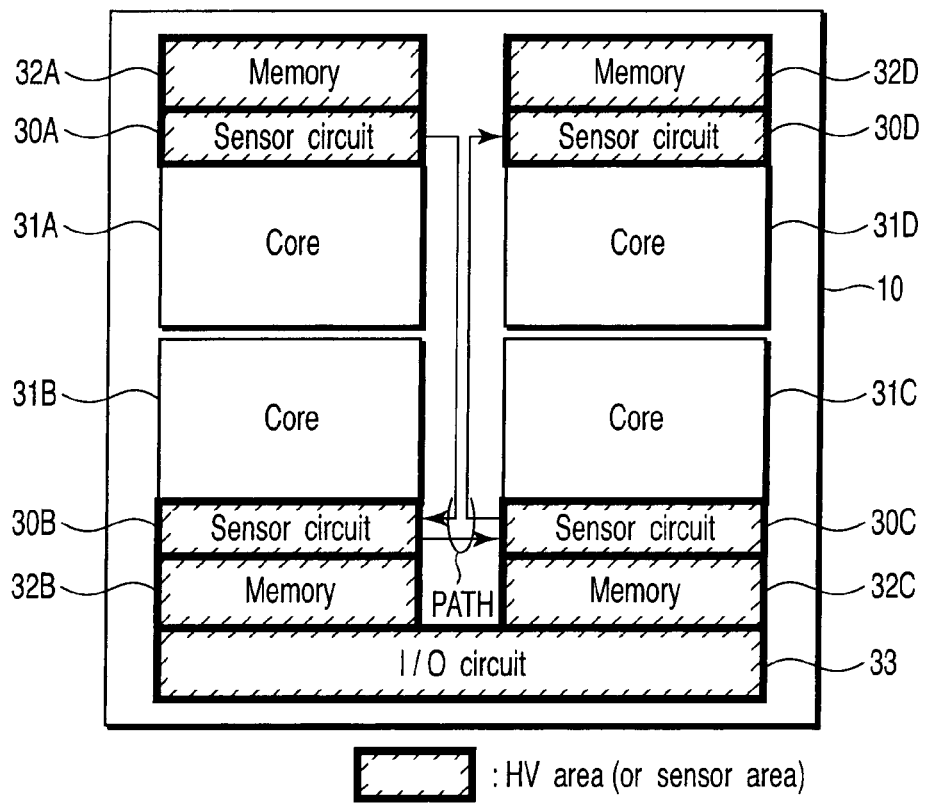
FIG. 15 is a view showing a chip layout of an eighth embodiment of the invention.

FIG. 15 shows a chip layout according to an eighth embodiment.

In the eighth embodiment, the power source of temperature sense circuits 30A, 30B, 30C, and 30D is shared by memories (embedded DRAMs) 32A, 32B, 32C, and 32D and an I/O circuit 33. Accordingly, the memories 32A, 32B, 32C, and 32D and the I/O circuit 33 are disposed in the HV area in the first and second embodiments or in the sensor area in the third and fourth embodiments like the temperature sense circuits 30A, 30B, 30C, and 30D.

This embodiment is effective when the power source voltage of the memories 32A, 32B, 32C, and 32D and the I/O circuit 33 cannot follow the reduction of the voltage of cores 31A, 31B, 31C, and 31D. When the temperature sense circuits 30A, 30B, 30C, and 30D, the memories 32A, 32B, 32C, and 32D, and the I/O circuit 33 are disposed together in a few locations, the power source can be easily shared by them.

3. Application Examples

Next, application examples of the semiconductor integrated circuit according to the present invention will be described.

Figure 16:
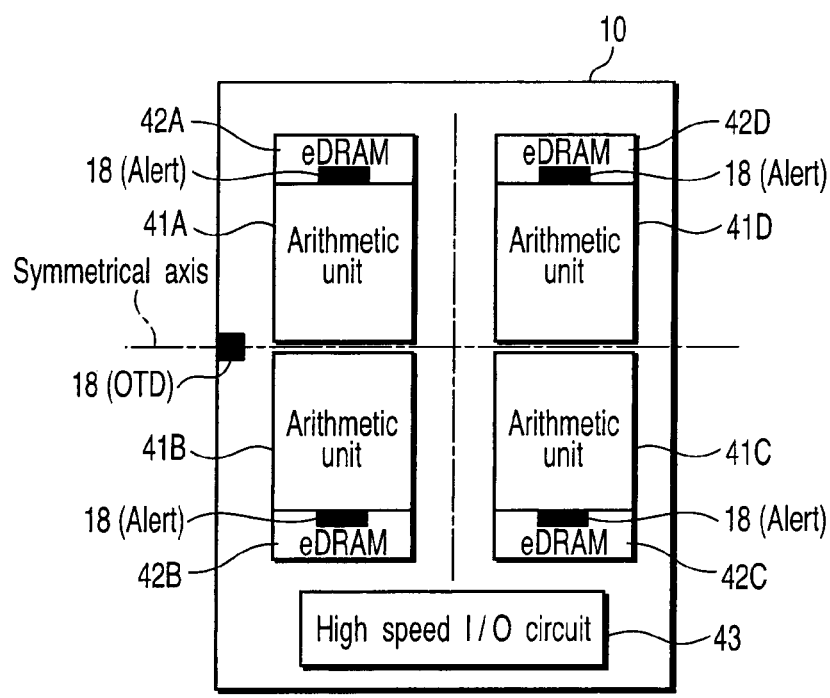
FIG. 16 is a view showing a chip layout of a GPU as an application example.

FIG. 16 is shows a chip layout of a graphics processing unit (GPU).

A chip 10 includes arithmetic unit blocks 41A, 41B, 41C, and 41D, in which large power is consumed and hence the temperature has to be monitored, a thermal sensor 18 (OTD), thermal sensors 18 (Alert), embedded DRAMs (eDRAMs) 42A, 42B, 42C, and 42D, and a high speed I/O circuit 43 disposed therein.

The thermal sensor 18 (OTD) is a sensor composed of an OTD and placed on the symmetrical axis of the arithmetic unit blocks 41A, 41B, 41C, and 41D along the edge of the chip 10.

The thermal sensors 18 (Alert) are sensors each composed of an alert circuit and placed symmetrically in the chip 10.

Further, the thermal sensors 18 (Alert) are placed between the arithmetic unit blocks 41A, 41B, 41C, and 41D and the embedded DRAMs 42A, 42B, 42C, and 42D as well as placed in line symmetry with the symmetric axis of the arithmetic unit blocks 41A, 41B, 41C, and 41D or in point symmetry with the intersecting point of the symmetric axes of the arithmetic unit blocks 41A, 41B, 41C, and 41D.

Note that the example of the present invention can be also applied to ordinary processors such as a central processing unit (CPU) as well as the GPU.

FIG. 17 shows an example of a thermal sensor (alert circuit).

The OTD has temperature dependency of, for example, 2 mv/° C. or less. When a bias is applied to a current source 45 by a bias circuit 44 and a current is flown to the OTD, a detection signal, which depends on a chip temperature, is input to the "minus" input terminal of a differential amplifier 46. Further, a reference voltage Vtemp output from a trimming circuit 47 is input to the "plus" input terminal of the differential amplifier 46.

The value of the reference voltage Vtemp is determined based on the trimming data input in the trimming circuit of the thermal sensor 18 (Alert).

When an enable signal Enable is set to "H", a NAND circuit 48 is enabled, and an alert signal Alert as the detection signal output from the NAND circuit 48 is set to a value according to the output signal from the differential amplifier 46.

FIG. 18 shows a circuit example of the thermal sensor shown in FIG. 17.

A BGR circuit, for example, is used as the bias circuit 44. The current source 45 is composed of a P channel MOS transistor.

The trimming circuit 47 is composed of a plurality of P channel MOS transistors having a different size (drive force). Since a plurality of bits, for example, 6-bit trimming data Trim <0>, Trim <1> . . . , Trim <5> are input to the trimming circuit 47, 64 kinds of trimming can be executed.

4. Others

According to the examples of the present invention, since the temperature control contents of the thermal sensor can be accurately trimmed, the chip performance and the reliability can be enhanced.

Although the case in which the LV area and the HV area are included in the same chip and the case in which the core area and the sensor area are included in the same chip have been described in the embodiments described above, the examples of the present invention can be also applied to the case in which these areas exist in a different chip.

In the case of a multi chip module (MCM) in which a plurality of chips are accommodated in one package, it is also possible to dispose the LV area and the HV area in a different chip, to dispose the core area and the sensor area in a different chip, and to independently dispose power sources to the respective chips.

Also in this case, since the power sources are separately disposed, no leakage occurs in the core when the trimming test of the thermal sensors is executed, thereby the trimming test can be executed accurately.

Further, in the embodiments described above, the first input path and the first output path are disposed in the HV area or in the sensor area. That is, in the first input path and the first output path, there are no circuits, such as a repeater, which needs the power source voltage LV to operate.

The example, in which the system is composed of the two kinds of different power source voltages (except ground voltage Vss) LV and HV, has been explained in the embodiments described above, the examples of the present invention can be also applied to the case in which more than the two kinds of power source voltages exist.

Further, in the examples of the present invention, the elements such as the mode and the circuit arrangement of the thermal sensor 18 are not particularly limited.

When, for example, a partial increase of temperature in the chip is detected by monitoring current and voltage characteristics outside of the chip, the on-chip thermal diode (OTD) can be used as the thermal sensor.

Further, when, for example, a temperature is detected in the chip, the alert circuit can be used as the thermal sensor.

The alert circuit is a on-chip temperature detection circuit which compares a turn-on voltage (Vf) of a junction diode (OTD) having temperature dependency, with a reference potential having no temperature dependency, created by a band gap reference (BGR) circuit. An alert signal Alert outputs when a temperature exceeds a predetermined value.

Further, the power source voltage of the core power source is set to, for example, 1V or less, and the power source voltage of the power source of the thermal sensor is set to, for example, 2.8V.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A trimming test method of a thermal sensor which is provided in a semiconductor integrated circuit including a system that uses first and second power source voltages independently, the thermal sensor being provided in a first area different from a second area, the method comprising:
   supplying the first power source voltage to the first area without supplying the second power source voltage to the second area in a first mode;
   inputting first trimming data to the thermal sensor making use of a first input path disposed in the first area;
   calibrating the temperature of the thermal sensor based on the first trimming data;
   supplying the first power source voltage to the first area and the second power source voltage to the second area in a second mode;
   inputting second trimming data different from the first trimming data to the thermal sensor making use of a second input path disposed in the second area; and
   trimming the temperature of the thermal sensor based on the second trimming data.

2. The trimming test method according to claim 1, wherein the first trimming data is output making use of a data output terminal disposed in the first area.

3. The trimming test method according to claim 1, wherein the first power source voltage is supplied to a first power supply terminal, and the second power source voltage is supplied to a second power supply terminal.

4. The trimming test method according to claim 1, wherein the first and second power source voltages are generated by a voltage generation circuit.

5. The trimming test method according to claim 1, wherein the first power source voltage is higher than the second power source voltage.

6. The trimming test method according to claim 1, wherein an alert signal detected by the thermal sensor is output making use of a first output path disposed in the first area.

7. The trimming test method according to claim 1, wherein an alert signal detected by the thermal sensor is output making use of a temperature management module disposed in the second area.

8. The trimming test method according to claim 1, further comprising:
   selecting one of the first and second input paths by using a selector disposed in the first area.

9. The trimming test method according to claim 5, wherein data is transferred between the first and second areas through a voltage converter.

10. The trimming test method according to claim 8, wherein the first mode is a test mode that executes a calibration of the temperature of the thermal sensor, and the selector selects the first input path in the first mode.

11. The trimming test method according to claim 8, wherein the second mode is a normal operation mode that executes a trimming of the temperature of the thermal sensor, and in which the selector selects the second input path in the second mode.

* * * * *